(12) United States Patent
Zheng et al.

(10) Patent No.: US 10,782,805 B2
(45) Date of Patent: Sep. 22, 2020

(54) TOUCH PANEL, INCLUDING BLANKING LAYER, TOUCH DISPLAY DEVICE INCLUDING TOUCH PANEL AND METHOD FOR MANUFACTURING TOUCH PANEL

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Qitao Zheng, Beijing (CN); Ming Hu, Beijing (CN); Ming Zhang, Beijing (CN); Zouming Xu, Beijing (CN); Guiyu Zhang, Beijing (CN); Tong Chen, Beijing (CN); Jing Wang, Beijing (CN); Xiaodong Xie, Beijing (CN); Kongshuo Zhu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 117 days.

(21) Appl. No.: 15/755,737

(22) PCT Filed: Aug. 25, 2017

(86) PCT No.: PCT/CN2017/099034
§ 371 (c)(1),
(2) Date: Feb. 27, 2018

(87) PCT Pub. No.: WO2018/126710
PCT Pub. Date: Jul. 12, 2018

(65) Prior Publication Data
US 2019/0025968 A1    Jan. 24, 2019

(30) Foreign Application Priority Data

Jan. 4, 2017   (CN) .......................... 2017 1 0004840

(51) Int. Cl.
*G06F 3/041*       (2006.01)
*G02F 1/1335*      (2006.01)
(Continued)

(52) U.S. Cl.
CPC .......... *G06F 3/0412* (2013.01); *G02F 1/1343* (2013.01); *G02F 1/133512* (2013.01); *G06F 3/044* (2013.01); *G06F 2203/04103* (2013.01)

(58) Field of Classification Search
CPC ................... G06F 3/0412; G06F 3/044; G06F 2203/04103; G02F 1/1343; G02F 1/133512
See application file for complete search history.

(56) References Cited

U.S. PATENT DOCUMENTS

2015/0253899 A1* 9/2015 Yang ........................ G06F 3/044
                                                            345/174
2017/0186371 A1* 6/2017 Takahashi ............. G06F 3/0416

FOREIGN PATENT DOCUMENTS

CN    103353815 A    10/2013
CN    104156118 A    11/2014
(Continued)

OTHER PUBLICATIONS

International Search Report and Written Opinion dated Nov. 29, 2017; PCT/CN2017/099034.

*Primary Examiner* — Yaron Cohen

(57) ABSTRACT

A touch panel, a touch display device and a method for manufacturing the touch panel are provided. The touch panel includes a first substrate and a second substrate which are oppositely arranged; a first blanking layer formed on the first substrate; a touch electrode layer formed on the first blank- (Continued)

ing layer; and a second blanking layer formed on the second substrate. A side of the first substrate provided with the first blanking layer and the touch electrode layer faces a side of the second substrate provided with the second blanking layer.

12 Claims, 4 Drawing Sheets

(51) Int. Cl.
  *G02F 1/1343* (2006.01)
  *G06F 3/044* (2006.01)

(56) References Cited

FOREIGN PATENT DOCUMENTS

| | | |
|---|---|---|
| CN | 104571764 A | 4/2015 |
| CN | 105677115 A | 6/2016 |
| CN | 106708322 A | 5/2017 |
| CN | 206322138 U | 7/2017 |

* cited by examiner

US 10,782,805 B2

TOUCH PANEL, INCLUDING BLANKING LAYER, TOUCH DISPLAY DEVICE INCLUDING TOUCH PANEL AND METHOD FOR MANUFACTURING TOUCH PANEL

The application claims priority to the Chinese patent application No. 201710004840.9, filed Jan. 4, 2017, the disclosure of which is incorporated herein by reference as part of the application.

TECHNICAL FIELD

Embodiments of the present disclosure relate to a touch panel, a touch display device and a method for manufacturing the touch panel.

BACKGROUND

Single-layer indium tin oxide (SITO) touch panel technology is widely applied in small-size products such as watches. In the use of these small-size products, e.g., checking the time, timing and other operations, the eyes of the user are very close to the screen, so a small amount of defects on the screens of this kind of products will greatly affect the user experience. Therefore, the blanking level of this kind of products is very high.

SUMMARY

The present disclosure provides a touch panel, a touch display device and a method for manufacturing the touch panel.

One embodiment of the disclosure provides a touch panel, comprising: a first substrate and a second substrate which are oppositely arranged; a first blanking layer formed on the first substrate; a touch electrode layer formed on the first blanking layer; and a second blanking layer formed on the second substrate, wherein a side of the first substrate provided with the first blanking layer and the touch electrode layer faces a side of the second substrate provided with the second blanking layer.

In some examples, the touch electrode layer includes a touch electrode pattern and a touch electrode bonding area.

In some examples, at least one of an adhesive layer or a gap layer is disposed between the first blanking layer formed on the first substrate and the second blanking layer formed on the second substrate.

In some examples, the touch electrode bonding area is disposed on a peripheral area of the first substrate and electrically connected with the touch electrode pattern.

In some examples, the touch panel further comprises: a black matrix (BM) layer disposed on the peripheral area of the first substrate.

In some examples, at least one of the first blanking layer or the second blanking layer includes a silicon nitride layer or a superimposed layer of silicon dioxide ($SiO_2$) and niobium pentoxide ($Nb_2O_5$).

One embodiment of the disclosure provides a touch display device, comprising a display panel and the touch panel according to any embodiment as mentioned above, wherein the touch panel is disposed on a display surface side of the display panel.

One embodiment of the disclosure provides a method for manufacturing a touch panel, comprising: forming a first blanking layer on a first substrate; forming a touch electrode layer on the first blanking layer; forming a second blanking layer on a second substrate; and bonding the first substrate and the second substrate so that a side of the first substrate provided with the first blanking layer and the touch electrode layer to face a side of the second substrate provided with the second blanking layer.

In some examples, forming the touch electrode layer on the first blanking layer includes: depositing a conductive film on the first blanking layer, patterning the conductive film to form the touch electrode layer, the touch electrode layer includes a touch electrode pattern and a touch electrode bonding area electrically connected with the touch electrode pattern.

In some examples, bonding the first substrate and the second substrate includes: applying an adhesive layer between the first substrate provided with the first blanking layer and the touch electrode layer and the second substrate provided with the second blanking layer so as to bond the first substrate and the second substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise specified, the technical terms or scientific terms used in the disclosure have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

Figure 1:
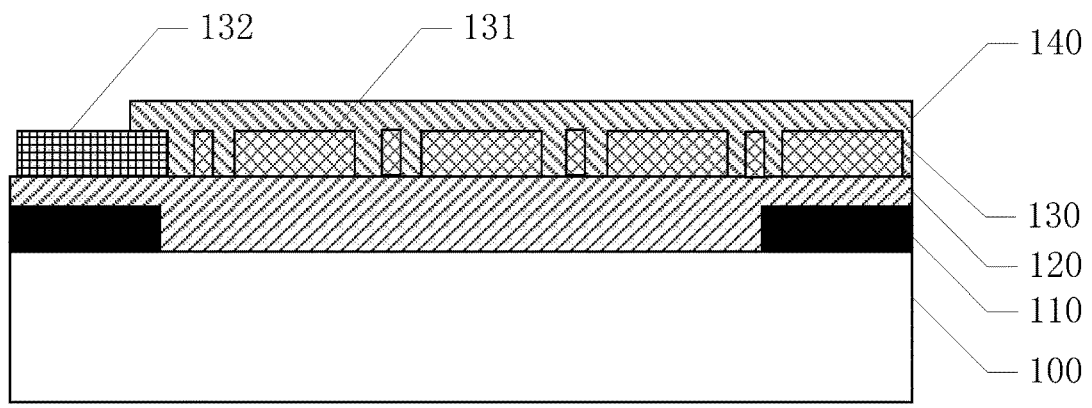
FIG. 1 is a schematic structural sectional view of a substrate of a touch panel, provided with a touch electrode layer.

The single-layer indium tin oxide (SITO) touch technology has low cost and can realize multi-point touch. The SITO touch sensor refers to a touch sensor formed by coating one ITO layer on a glass or plastic substrate and etching the ITO to form electrodes. In the touch sensor, the ITO electrodes not only can be taken as driving electrodes but also can be taken as sensing electrodes, and the touch function can be realized without other layers. However, due to large difference between the refractive index of the ITO and the refractive index of the glass substrate, after etched ITO patterns form lines or electrodes, the difference between the reflectivity of ITO areas and non-ITO areas is large, so etched lines are very obvious, and hence the visual sense of users can be affected. In a small-size panel, as the eyes of the viewer are close to the panel, the problem is more obvious. In order to enhance the blanking effect, in some touch panels, an blanking layer is formed on both sides of the ITO layer. FIG. 1 is a schematic structural sectional view of a substrate of a touch panel, provided with a touch electrode layer. The substrate includes a black matrix (BM) 110, a first blanking layer 120, a touch electrode layer 130 and a second blanking layer 140 which are sequentially formed on a base substrate 100. The touch electrode layer 130 includes touch sensing electrodes 131 used for touch sensing and touch electrode bonding areas 132 disposed on a peripheral area (edge area) of the substrate. In the touch electrode bonding area, the touch electrode layer must be exposed so as to be connected with other components (e.g., conductive lines). Therefore, the second blanking layer 140 formed on the touch electrode layer 130 must be etched to expose the touch electrode bonding areas beneath the second blanking layer. However, in the process of etching the second blanking layer 140, the first blanking layer 120 will be inevitably over-etched, so the blanking effect can be reduced.

Figure 2:
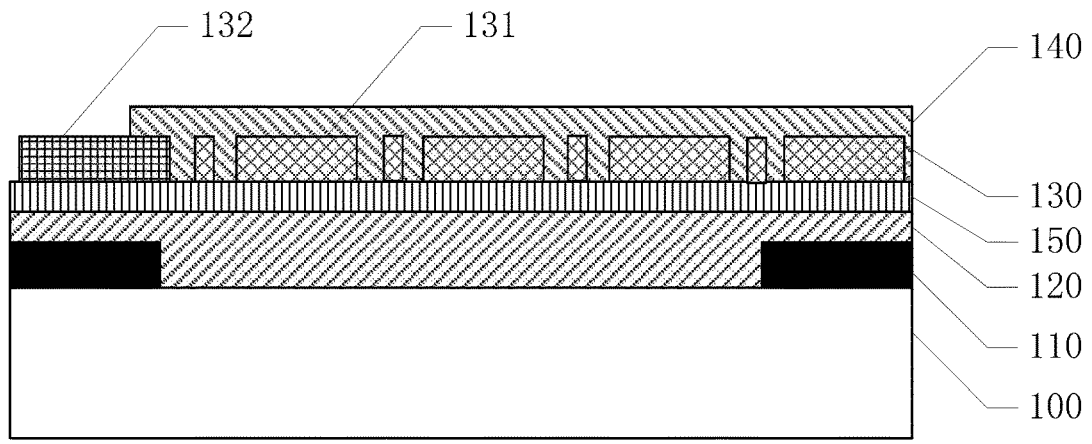
FIG. 2 is a schematic structural sectional view of a substrate of another touch panel, provided with a touch electrode layer.

In order to solve the above problem, another touch panel is provided. FIG. 2 is a schematic structural sectional view of a substrate of another touch panel, provided with a touch electrode layer. As shown in FIG. 2, the difference between the substrate and the substrate as shown in FIG. 1 is that one protective layer 150 is disposed between the touch electrode layer 130 and the first blanking layer 120. Due to the addition of the protective layer 150, in the process of etching the second blanking layer 140, the first blanking layer 120 will not be over-etched. However, the structure requires an additional process for forming the protective layer and hence increases the cost and reduces the productivity.

FIGS. 1 and 2 only show a part of the touch panel, namely the substrate provided with the touch electrode layer. In the process of manufacturing the touch panel, one cover plate (e.g., cover glass) is generally required to cover a side of the substrate provided with elements such as the touch electrode layer, so as to protect various kinds of elements formed on the substrate. The inventor of the application has noticed that the etching of the second blanking layer due to the exposure of the touch electrode bonding areas can be avoided by transferring the manufacturing process of the second blanking layer onto the cover plate, namely the second blanking layer is not formed on the substrate provided with the touch electrode layer but formed on the cover plate. Moreover, in this case, when the cover plate is bonded with the substrate provided with the touch electrode layer, the formed touch panel also comprises two blanking layers. One blanking layer is disposed on an upper side of the touch electrode layer and one blanking layer is disposed on a lower side of the touch electrode layer. Compared with the structure in which both the first blanking layer and the second blanking layer are formed on the substrate provided with the touch electrode layer, the blanking effect of the structure is absolutely not affected. In addition, as the second blanking layer is not required to be over-etched, the over-etching of the first blanking layer is avoided, and the etching process of etching the second blanking layer is also saved.

Figure 3:
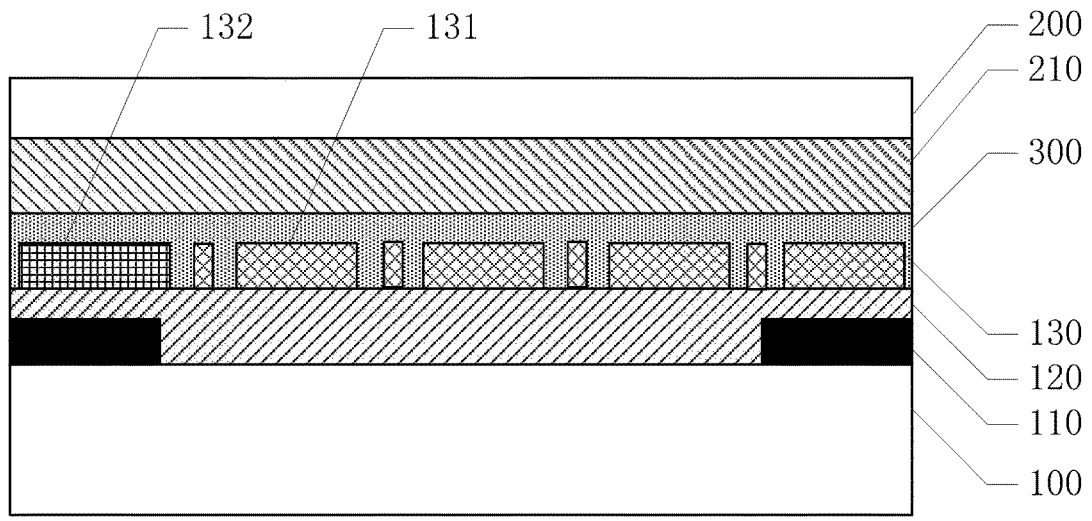
FIG. 3 is a schematic structural sectional view of a touch panel provided by one embodiment of the present disclosure.
Figure 4:
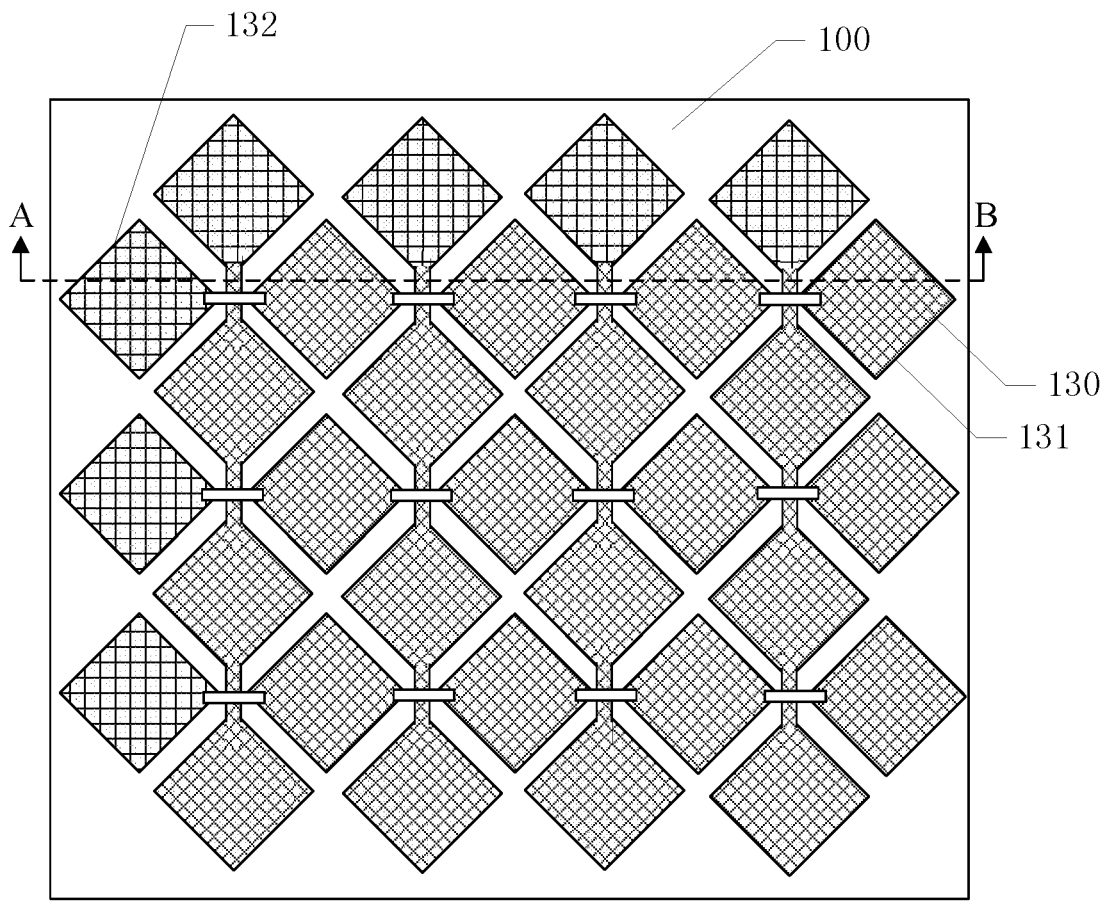
FIG. 4 is a schematic structural plan view of the touch panel provided by one embodiment of the present disclosure.

FIG. 3 is a schematic structural sectional view of a touch panel provided by one embodiment of the present disclosure. FIG. 4 is a schematic structural sectional view of the touch panel provided by one embodiment of the present disclosure. For clearer illustration, FIG. 4 only shows a substrate and a touch electrode layer on the substrate. As illustrated in FIG. 3, the touch panel comprises a first substrate 100 and a second substrate 200 which are oppositely arranged; a first blanking layer 120 formed on the first substrate 100; a touch electrode layer 130 formed on the first blanking layer 120; and a second blanking layer 210 formed on the second substrate 200, in which a side of the first substrate 100 provided with the first blanking layer 120 faces a side of the second substrate 200 provided with the second blanking layer 210.

For instance, each of the first substrate 100 and the second substrate 200, for instance, may be a transparent glass substrate. The first substrate 100 and the second substrate 200 may adopt substrate materials commonly used in the field. No limitation will be given here in the embodiment of the present disclosure.

The first blanking layer 120 is formed on the first substrate 100, and the touch electrode layer 130 is formed on the first blanking layer 120. The first blanking layer 120 may be selected according to physical parameters such as the reflectivity of the first substrate 100. The arrangement of the first blanking layer 120 can reduce the reflectivity difference between positions provided with the touch electrode layer (electrode patterns) and positions not provided with the touch electrode layer (the electrode patterns), and hence avoid the human eyes from easily recognizing the touch electrode patterns. For instance, the reflectivity of the first blanking layer 120 in visible areas is close to the reflectivity obtained after the forming of the touch electrode layer, so the color difference between areas provided with the touch electrode layer and etched areas of the touch electrode layer can be reduced, and hence the blanking effect can be realized.

The first blanking layer 120 may be a single-layer structure or a multi-layer structure, may be made from a single material, and may also be made from composite materials including a plurality of materials. For instance, the first blanking layer 120 may include a superimposed layer structure of $SiO_2$ and $Nb_2O_5$. For instance, the thickness of a $SiO_2$ layer in the first blanking layer 120 may be 5-15 nm, and the thickness of an $Nb_2O_5$ layer may be 10-40 nm. In other examples, silicon nitride (SiNx, "X" represents that the elements Si and N can have different stoichiometric proportions) may be adopted to form the first blanking layer 120.

For instance, the material and the thickness of the first blanking layer 120 may also be appropriately adjusted according to the thickness of the touch electrode layer 130 (e.g., an ITO layer) formed thereon, so as to achieve good blanking effect. However, the embodiment of the present disclosure is not limited to the blanking layer formed by the superimposed layer of $SiO_2$ and $Nb_2O_5$ or the blanking layer formed by SiNx, and any material may be used for forming the first blanking layer in the embodiment of the present disclosure as long as the blanking effect can be realized on the substrate provided with the touch electrode layer. In addition, the material, the structure and the thickness of the blanking layer may also be specifically selected according to the materials of the substrate and touch electrodes on the substrate. No specific limitation will be given here in the embodiment of the present disclosure.

The touch electrode layer 130 is, for instance, formed by patterning a conductive film. For instance, the conductive film may be a transparent conductive film. For instance, the transparent conductive film may be transparent metal oxide such as indium tin oxide (ITO), aluminum zinc oxide (AZO) and indium zinc oxide (IZO). For instance, the thickness of the touch electrode layer may be 20-30 nm, but no specific limitation will be given here in the embodiment of the present disclosure.

FIG. 4 illustrates a planar structure of the touch electrode layer 130 formed on the first substrate 100. As described above, in order to more clearly show the structure of the transparent electrode layer, other elements are omitted in FIG. 4, but FIG. 3 is, for instance, a sectional view of the touch panel taken along AB line positions of FIG. 4. For instance, the transparent electrode layer 130 includes a plurality of first electrodes extended along the transverse direction of FIG. 4 and a plurality of second electrodes extended along the longitudinal direction of FIG. 4. A capacitor structure may be formed between the first electrode and the second electrode, so as to form a touch sensing element. For instance, one of the first electrode and the second electrode may be taken as a driving electrode for touch sensing and the other may be taken as a sensing electrode for touch sensing, but no specific limitation will be given here in the embodiment of the present disclosure.

For instance, an end portion of each first electrode or each second electrode includes a touch electrode bonding area 132 and touch electrode patterns 131 electrically connected with the touch electrode bonding area 132. For instance, the touch electrode patterns 131 are electrode patterns used for detecting touch action; and input and output signals of the touch electrode patterns 131 are transmitted through the touch electrode bonding area 132. For instance, as shown in FIG. 4, the touch electrode bonding area 132 of the transversely extended touch electrode patterns 131 is disposed on the left end of the touch electrode patterns, and the touch electrode bonding area 132 of the longitudinally extended touch electrode patterns 131 is disposed on the upper end of the touch electrode patterns. The touch electrode patterns and the touch electrode bonding areas are distinguished in FIG. 4 by different shadow patterns. FIG. 4 only shows an illustrative structure of the touch electrode layer in the touch panel provided by the embodiment of the present disclosure. The embodiment of the present disclosure is not limited to the specific positional relationship between the touch electrode patterns 131 and the touch electrode bonding areas 132 as shown in the figure. For instance, the touch electrode bonding area may also be disposed on the lower side or the right side of the touch electrode patterns and may also be disposed on the upper side, the lower side, the left side and the right side of the touch electrode patterns. For instance, the touch electrode patterns may be disposed in a central area (active area) of the touch panel, and the touch electrode bonding areas may be disposed on a peripheral area surrounding the central area of the touch panel. For instance, the active area of the touch panel occupies most plane area of the touch panel.

The touch electrode patterns must sense the variance of the capacitance or other physical parameters brought by the proximity or contact of a target. For instance, each of the first electrode and the second electrode includes a plurality of diamond patterns. Patterns arranged along the same row or the same column are electrically connected with each other to form first electrodes and second electrodes extended along the transverse and longitudinal directions. For instance, as shown in FIG. 4, the plurality of diamond patterns of the first electrodes and the second electrodes are formed in the same layer; the diamond patterns of the longitudinal extended second electrodes are connected with strip structures integrally formed with the electrode patterns; and the diamond patterns of the transversely extended first electrodes are connected with conductive bars (bridge electrodes) disposed in different layers with the diamond patterns. For instance, the conductive bars and the strip structures integrally formed with the diamond patterns may be isolated from each other through an insulating layer to avoid the short circuit between the conductive bars and the strip structures. For instance, the conductive bars may also be made from transparent conductive materials. The patterns as shown in FIG. 4 are diamond structures. However, no special limitation will be given here in the embodiment of the present disclosure, and the above patterns may be strip-shaped or in any other suitable shape. FIG. 4 only illustrates that each first electrode and each second electrode include four diamond electrode patterns. But no specific limitation will be given here in the embodiment of the present disclosure. Each first electrode and each second electrode may include less or more electrode patterns.

Driving signals of the touch electrode patterns 131 must be inputted or sensing signals must be outputted. For instance, the driving signals or the sensing signals of the touch electrode patterns 131 are inputted or outputted through the touch electrode bonding areas. The touch electrode bonding areas 132 may be connected with leads and used for the input of external signals or the output of the sensing signals. Although different shadow patterns are adopted in FIGS. 3 and 4 to show the touch electrode bonding areas 132 and the touch electrode patterns 131, the touch electrode bonding areas 132 and the touch electrode patterns 131 may be arranged in the same layer and made from same materials; or may also be formed by the same patterning process. The touch electrode bonding areas 132 and the touch electrode patterns 131 are electrically connected and used for signal transmission. In some examples, the touch electrode layer 130 is made from ITO. For instance, the touch electrode layer includes ITO sensing electrodes 131 and ITO bonding areas 132. For instance, the touch electrode bonding areas 132 are formed on a peripheral area of the touch panel.

In the example of the touch panel as shown in FIGS. 3 and 4, the touch electrode patterns (except the bridge electrodes) of the touch electrode layer are all formed in one layer. But the embodiment of the present disclosure is not limited thereto. Different electrode patterns may also be formed in different layers. For instance, the transversely extended first electrodes and the longitudinally extended second electrodes may be formed in different layers. As the electrodes extended along different directions are formed in different layers, the bridge electrodes are not required to be additionally designed at intersected positions of the electrodes. For instance, an insulating layer must be also disposed between the touch electrodes in different layers to avoid the short circuit between the touch electrodes in different layers.

The second blanking layer 210 formed on the second substrate 200, for instance, may be made from same materials with the first blanking layer 120, and may also be made from different materials with the first blanking layer 120. In addition, the thickness of the second blanking layer 210 may be the same with that of the first blanking layer 120 and may also be different from that of the first blanking layer 120. For instance, the second blanking layer 210 may include a superimposed layer structure of $SiO_2$ and $Nb_2O_5$. For instance, the thickness of a $SiO_2$ layer in the second blanking layer 210 may be 5-15 nm, and the thickness of an $Nb_2O_5$ layer may be 10-40 nm. The second substrate 200 is, for instance, cover glass which is bonded to one side of the first substrate 100 provided with the touch electrode layer 130, so as to protect various kinds of elements formed on the first substrate 100.

For instance, a side of the second substrate 200 provided with the second blanking layer 210 may be bonded to a side of the first substrate 100 provided with the transparent electrode layer 130 and the first blanking layer 110 through an adhesive layer 300. No special limitation will be given to the adhesive layer for bonding the first substrate and the second substrate in the embodiment of the present disclosure, as long as the required bonding performance and optical performance of the touch panel can be satisfied. For instance, the above bonding process adopts direct bonding. That is to say, optically clear adhesive (OCA) is coated on the entire surface to be bonded of the first substrate or the second substrate, and the first substrate and the second substrate are bonded with each other through the adhesive layer. In this case, the adhesive layer will be disposed in the entire plane area between the first substrate 100 and the second substrate 200. For instance, the touch panel as shown in FIG. 3 adopts direct bonding means, and the adhesive layer 300 is disposed between the second blanking layer 210 and the first blanking layer 120 and between the second blanking layer 210 and the transparent electrode layer 131.

In the touch panel provided by the embodiment of the present disclosure, the first blanking layer 120 is formed on the first substrate 100; the second blanking layer 210 is formed on the second substrate 200; and the transparent electrode layer 130 is clamped between the first blanking layer 120 and the second blanking layer 210. The first blanking layer 120, the transparent electrode layer 130 and the second blanking layer 210 form a sandwich structure. The sandwich structure is clamped between the first substrate 100 and the second substrate 200. As the blanking layers are formed on both sides of the transparent electrode layer (the touch electrode layer), namely two blanking layers are formed, the blanking effect can be improved. The electrode patterns of the touch electrode layer will not be obviously viewed in touch products requiring close observation. In addition, as the second blanking layer 210 is formed on the second substrate 200 and not formed on the transparent electrode layer on the first substrate 100, the second blanking layer 210 is not required to be etched to expose the touch electrode bonding areas in the manufacturing process, so the over-etching of the first blanking layer 120 in the process of etching the second blanking layer 210 can be avoided, and hence the reduction of the blanking effect caused by over-etching can be avoided. In addition, as the second blanking layer 210 is not required to be etched, the etching process is also reduced, and the production cost is reduced.

In addition, as can be seen from FIG. 3, the BM layer 110 is also formed on the first substrate 100. For instance, the BM layer 110 is formed on the touch panel, namely on a peripheral area of the first substrate 100, to avoid the light leakage on the periphery of the touch panel. Moreover, the BM layer 110 is not a necessary structure and may also be added or removed according to the demands of specific products. Although the BM layer is formed on the first substrate 100 and on the lower side of the first blanking layer 120 in the touch panel as shown in FIG. 3, the embodiment of the present disclosure is not limited thereto, and the BM may also be formed on the upper side of the blanking layer, namely one side of the first blanking layer 120 away from the first substrate 100. Furthermore, for instance, the BM layer 110 may also be formed between other layers or may be formed on the second substrate 200. No special limitation will be given here in the embodiment of the present disclosure.

Although FIG. 3 only shows the first substrate 100, the BM 110, the first blanking layer 120, the touch electrode layer 130, the OCA layer 300, the second blanking layer 210 and the second substrate 200 of the touch panel, the touch panel provided by the present disclosure may further comprise any other suitable element or member, layer structure, electrode lead, etc. For instance, the touch panel provided by the embodiment of the present disclosure further comprises a lead structure (not shown in the figure) electrically connected with the touch electrode bonding areas of the touch electrode layer, an insulating layer between the bridge electrodes of the touch electrode layer and the transparent electrode layer on the lower layer, etc. Therefore, in the embodiment of the present disclosure, several elements or layer structures may be increased or decreased on the basis of the structure as shown in FIGS. 3 and 4.

In addition, although FIG. 4 illustrates that each electrode of the touch electrode layer 130 includes four diamond patterns, the embodiment of the present disclosure is not limited thereto. The patterns may be randomly set according to specific conditions. Although the sectional view of FIG. 3 illustrates that the electrode patterns are mutually isolated structures, as seen from the plan view (as shown in FIG. 4), the diamond patterns arranged in rows or columns may be mutually connected to form a plurality of touch electrodes which are longitudinally and transversely intersected with each other (as shown in FIG. 4). Although the sectional view of FIG. 3 shows that the touch electrode bonding areas 132 and the touch electrode patterns 131 are mutually isolated, the touch electrode bonding areas 132 and the touch electrode patterns 131 are actually electrically connected (as shown in FIG. 4), so driving or output signals may be provided for the touch electrode layer through the touch electrode bonding areas 132.

Figure 5:
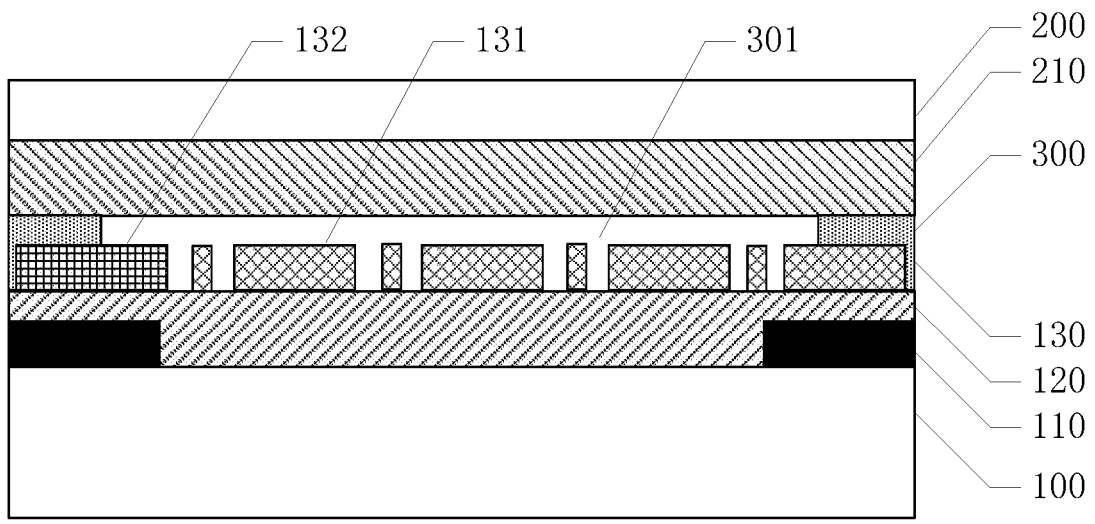
FIG. 5 is a schematic structural sectional view of a touch panel provided by one embodiment of the present disclosure.

FIG. 5 is a schematic structural sectional view of a touch panel provided by one embodiment of the present disclosure. The difference between the structure of the touch panel as shown in FIG. 5 and the structure of the touch panel as shown in FIG. 3 is different bonding means between the first substrate and the second substrate. The structure between two substrates is bonded by frame bonding means in FIG. 5. That is to say, the OCA layer 300 is only disposed on a peripheral area of the substrate and not coated on a central area surrounded by the peripheral area. Therefore, in the touch panel as shown in FIG. 5, a gap layer 301 is disposed between the second blanking layer 210 and the transparent electrode layer 130 or the first blanking layer 120. Other structures of the touch panel as shown in FIG. 5 may be the same with or similar to those of the touch panel as shown in FIG. 3. Moreover, the technical effects of the touch panel as shown in FIG. 3 can also be achieved. No further description will be given here.

As can be seen from the structures as shown in FIGS. 3 and 5, as the first blanking layer 120 and the second blanking layer 210 in the embodiment of the present disclosure are respectively formed on the first substrate 100 and the second substrate 200, after the two substrates are bonded with each other, at least one of the adhesive layer 300 or the gap layer is disposed between the first blanking layer 120 and the second blanking layer 210.

In the above touch panel structure, as the first blanking layer and the second blanking layer are respectively formed on different substrates in the process of manufacturing the touch panel, the etching process of the second blanking layer in the touch electrode bonding areas of the transparent electrode layer can be avoided, and hence adverse effects caused by the etching process can be avoided. The embodiment of the present disclosure further provides a method for manufacturing the touch panel.

Figure 6:
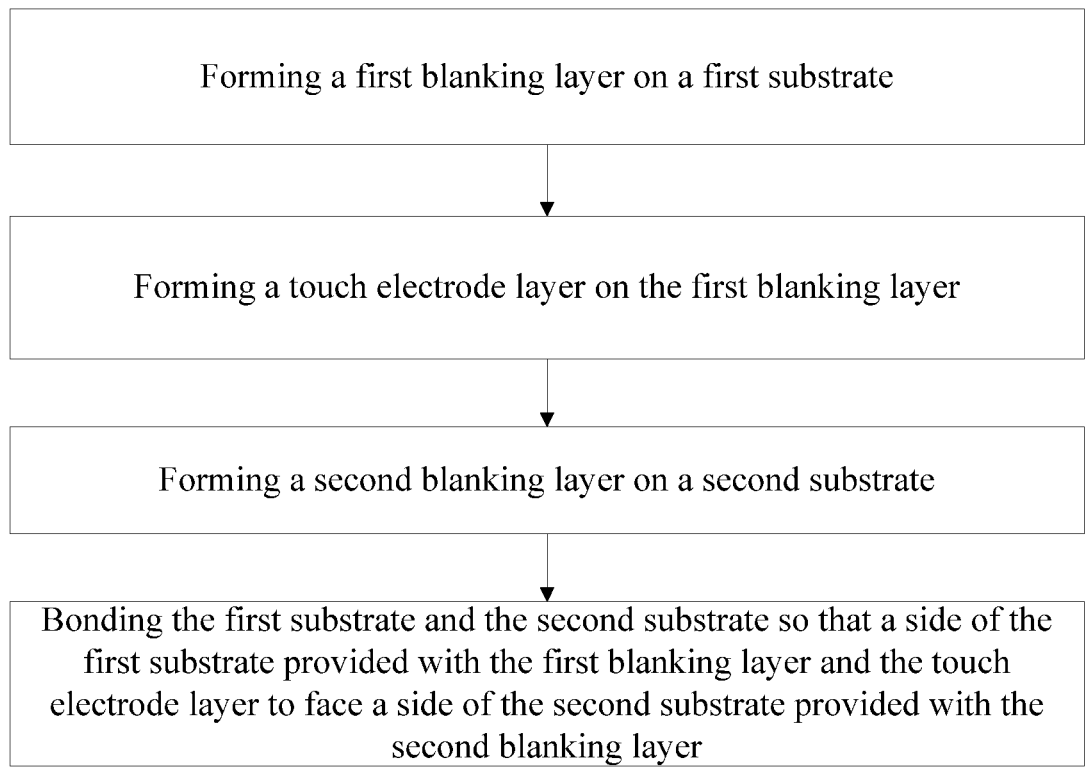
FIG. 6 is a flow diagram of a method for manufacturing a touch panel, provided by the embodiment of the present disclosure.

As illustrated in FIG. 6, the method for manufacturing the touch panel, provided by the embodiment of the present disclosure, comprises: forming a first blanking layer on a first substrate; forming a touch electrode layer on the first blanking layer; forming a second blanking layer on a second substrate; and bonding the first substrate and the second substrate so that a side of the first substrate provided with the first blanking layer and the touch electrode layer to face a side of the second substrate provided with the second blanking layer.

In the method for manufacturing the touch panel, provided by the embodiment of the present disclosure, apart from the capability of achieving the above technical effects described in combination with the structure of the touch panel, as only the forming position of the second blanking layer is changed, no additional process is increased. In addition, although the forming position of the second blanking layer in the forming process is changed, as layer structures or elements formed on the first substrate and the second substrate will be subsequently bonded with each other, the blanking layers are still disposed on both sides of the touch electrode layer, so the blanking effect similar to that of the touch panel as shown in FIG. 1 or 2 can be still achieved or almost achieved.

Figure 7:
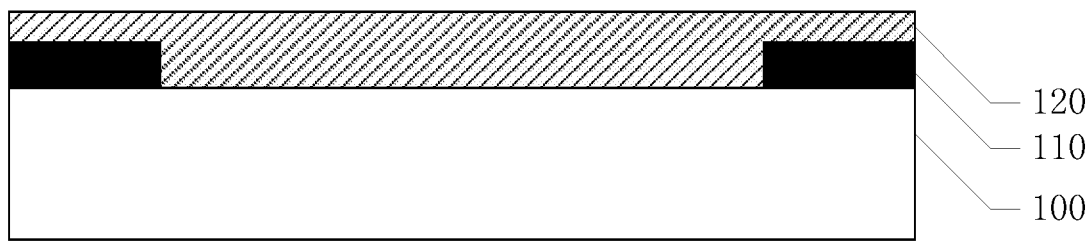
FIGS. 7-10 are schematic structural sectional views illustrating the manufacturing processes of the touch panel provided by the embodiment of the present disclosure.

For instance, the step of forming the first blanking layer 120 on the first substrate 100 may include the step of forming a superimposed structure of silicon dioxide and vanadic oxide and on the first substrate 100. In some embodiments, as shown in FIG. 7, the superimposed layer of vanadic oxide and silicon dioxide may be formed on the first substrate 100 by sputtering method.

In some examples, a BM layer 110 may also be formed on the first substrate 100 before the step of forming the first blanking layer. For instance, the BM layer 110 may be formed on a peripheral area of the first substrate in the form of a frame. The BM layer 110 may be made from black ink, chrome metal, black resin, etc. However, the embodiment of the present disclosure is not limited to the case of forming the BM layer 110 before the step of forming the first blanking layer 120, and the BM layer 110 may also be formed after the step of forming the blanking layer 120, namely the BM layer is formed on the first blanking layer 120.

Figure 8:
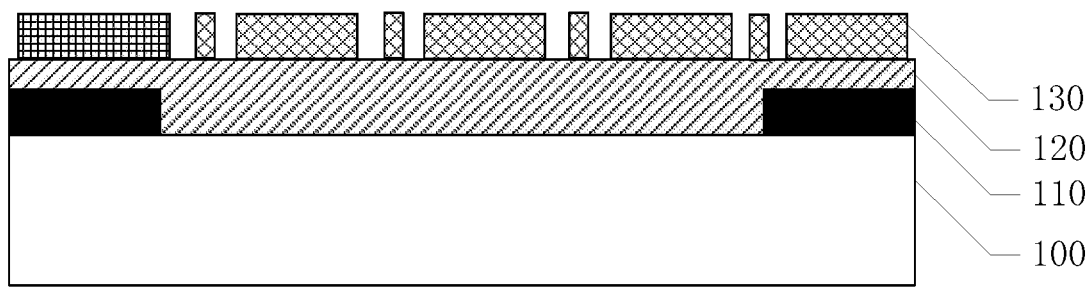

After the step of forming the first blanking layer 120, as shown in FIG. 8, the touch electrode layer 130 is formed on the first blanking layer 120. For instance, one layer of transparent conductive film is formed on the first blanking layer 120 by vacuum sputtering through low-temperature (e.g., 200° C.-250° C.) forming process. For instance, the transparent conductive film may be transparent conductive film such as ITO, AZO and IZO. No special limitation will be given here in the embodiment of the present disclosure. After the transparent conductive film is formed, the transparent conductive film may be patterned by processes such as photoresist coating, exposure, development and etching. However, the embodiment of the present disclosure is not limited to the above patterning means. The patterned transparent conductive film forms the touch electrode layer. For instance, as shown in FIG. 4, the touch electrode layer 130 may include transversely extended first electrodes and longitudinally extended second electrodes. Each of the first electrode and the second electrode includes a plurality of diamond patterns. The patterns arranged along the same row or the same column are electrically connected with each other to form the first electrodes and the second electrodes which are transversely and longitudinally extended. For instance, the plurality of electrode patterns (the diamond patterns in the figure) of the first electrodes and the second electrodes are formed in the same layer. Therefore, these electrode patterns may be formed by patterning the same layer of conductive film (e.g., a transparent conductive film). The plurality of electrode patterns of the longitudinally extended second electrodes are connected with strip structures integrally formed with the electrode patterns, and the electrode patterns of the transversely extended first electrodes are connected with conductive bars (bridge electrodes) disposed in different layers with the electrode patterns. For instance, at this point, the bridge electrodes must be formed in another patterning process. An insulating layer must be also formed between the conductive bars and the strip structures integrally formed with the electrode patterns to isolate the conductive bars and the strip structures. For instance, the conductive bars may also be made from transparent conductive materials. The above step is only one example of forming the touch conductive layer. The touch conductive layer may also be formed by any other suitable step.

Figure 9:
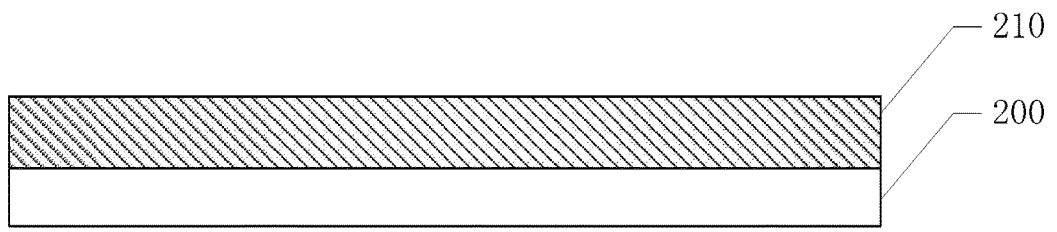

As shown in FIG. 9, the second blanking layer 210 is formed on the second substrate 200. For instance, a superimposed structure of silicon dioxide and vanadic oxide may be formed on the second substrate 200. In some embodiments, the superimposed structure of vanadic oxide and silicon dioxide may be formed on the second substrate 200 by magnetron sputtering. The second blanking layer 210, for instance, may be made from same materials with the first blanking layer 120, and may also be made from different materials with the first blanking layer 120. In addition, the thickness of the second blanking layer 210 may be the same with that of the first blanking layer 120 and may also be different from that of the first blanking layer 120.

Figure 10:
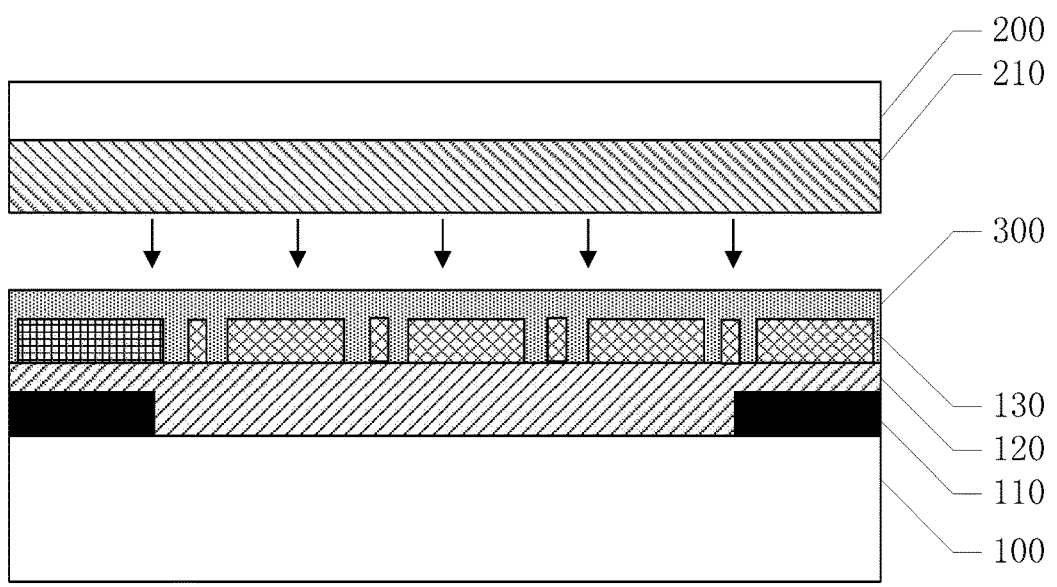

As described above, various kinds of layer structures are formed on the first substrate 100 and the second substrate 200. The second substrate 200 is generally cover glass and may protect various kinds of elements on the first substrate 100. For instance, as shown in FIG. 10, a side of the second substrate 200 provided with the blanking layer 210 may face one a side of the first substrate 100 provided with the touch electrode layer 130 and the first blanking layer 120. For instance, OCA may be coated on any one of the first substrate 100 and the second substrate 200, and subsequently the first substrate 100 and the second substrate 200 are bonded with each other. In the example as shown in FIG. 10, OCA 300 is coated on the first substrate 100, but the embodiment of the present disclosure is not limited thereto. For instance, the bonding means of the first substrate and the second substrate may include full bonding and frame bonding. In one example adopting full bonding means (as shown in FIG. 10), the OCA is coated on the entire surface of the first substrate provided with the blanking layer, and the second substrate is bonded to the first substrate so as to bond the first substrate and the second substrate. The touch panel structure formed by the direct bonding means may refer to FIG. 3, and the OCA layer is distributed within the entire plane range of the touch panel. The touch panel structure formed by frame bonding means may refer to FIG. 5, and the adhesive layer 300 is only distributed on a peripheral portion of the touch panel, and the gap layer 301 is formed in a central area surrounded by the peripheral portion.

Figure 11:
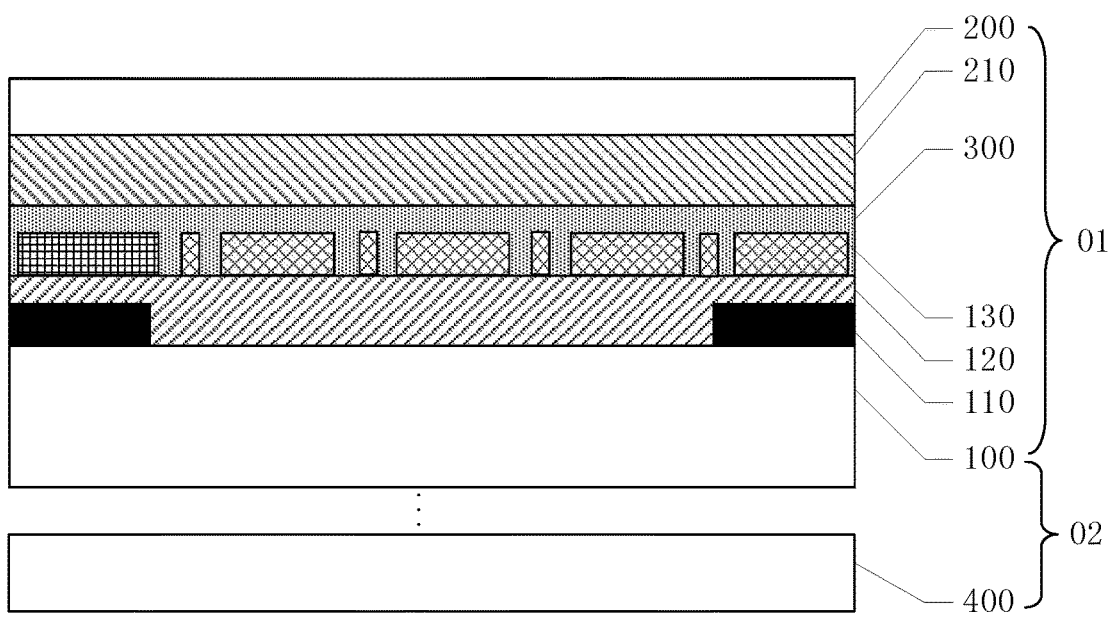
FIG. 11 is a schematic structural sectional view of a touch display device provided by one embodiment of the present disclosure.

The embodiment of the present disclosure further provides a touch display device, which comprises the foregoing touch panel and a display panel. The touch panel is disposed on a display surface side of the display panel. For instance, the display panel, for instance, may include a liquid crystal display (LCD) panel, an organic light-emitting diode (OLED) display panel, an electronic ink display panel, etc. For instance, the touch display panel provided by the embodiment of the present disclosure may be formed by directly bonding the touch panel to the display surface side of the display panel, but the embodiment of the present disclosure is not limited thereto. For instance, the touch display panel provided by the embodiment of the present disclosure may also be an on-cell touch display panel, namely the display panel and the touch panel may share one base substrate. FIG. 11 is a schematic structural sectional view of an on-cell touch display panel. The touch display panel comprises a touch panel 01 and a display panel 02. The touch panel 01 may be the touch panel provided by any foregoing embodiment. For instance, the display panel 02 may include an array substrate 400 and an opposed substrate 100. That is to say, the opposed substrate 100 of the display panel 02 and the first substrate 100 of the touch panel are mutually shared, and various kinds of elements and layer structures formed on the first substrate 100 may be formed on the opposed substrate of the display panel 02. For instance, thin-film transistor (TFT) elements in the form of arrays, other array elements and various kinds of circuit elements for controlling a display medium may be formed on the array substrate 400. For instance, in the case of the LCD panel, a liquid crystal layer may be disposed between the array substrate 400 and the opposed substrate 100; in the case of the OLED display panel, light-emitting diode (LED) elements may be disposed between the array substrate 400 and the opposed substrate 100; and in the case of the electronic ink display panel, electronic ink may be disposed between the array substrate 400 and the opposed substrate 100. These elements are not shown in detail in FIG. 11. In the touch display panel as shown in FIG. 11, the opposed substrate 100 of the display panel 02 and the first substrate 100 of the touch panel may be mutually shared, so the overall thickness of the touch display device can be reduced.

The method for manufacturing the touch panel may be used for manufacturing the touch panel provided by any foregoing embodiment, so the described structures or other characteristics of the touch panel are also applicable to the method for manufacturing the touch panel, provided by the embodiment of the present disclosure.

The touch panel and the manufacturing method thereof, provided by the embodiment of the present disclosure, may be applied to small-size products, so as to be suitable for high blanking level of this kind of products. But no special limitation will be given here in the embodiment of the present disclosure. The touch panel and the manufacturing method thereof may be also applicable to large-size products. In addition, the above embodiment mainly describes the touch electrode patterns formed by a single-layer conductive film. However, the embodiment of the present disclosure may also include touch electrode patterns formed by two-layer or multi-layer conductive films. Two blanking layers are disposed on both sides of these touch electrode patterns. Good blanking effect can be also achieved.

The foregoing is merely exemplary embodiments of the disclosure, but is not used to limit the protection scope of the disclosure. The protection scope of the disclosure shall be defined by the attached claims.

The invention claimed is:

1. A touch panel, comprising:
a first substrate and a second substrate which are oppositely arranged;
a first blanking layer formed on the first substrate;
a touch electrode layer formed on the first blanking layer; and
a second blanking layer formed on the second substrate,
wherein a side of the first substrate provided with the first blanking layer and the touch electrode layer faces a side of the second substrate provided with the second blanking layer,
wherein the touch electrode layer is located at a side of the first blanking layer opposite to the first substrate, and the touch electrode layer is located between the first blanking layer and the second blanking layer,
wherein the touch panel further comprises a black matrix (BM) layer disposed on the peripheral area of the first substrate,
the first blanking layer is disposed on the black matrix layer,
at least one of the first blanking layer or the second blanking layer includes a superimposed layer of silicon dioxide ($SiO_2$) and niobium pentoxide ($Nb_2O_5$), a thickness of the silicon dioxide is 5-15 nm and a thickness of the niobium pentoxide is 10-40 nm,
wherein the second substrate is a cover glass.

2. The touch panel according to claim 1, wherein the touch electrode layer includes a touch electrode pattern and a touch electrode bonding area.

3. The touch panel according to claim 1, wherein at least one of an adhesive layer or a gap layer is disposed between the first blanking layer formed on the first substrate and the second blanking layer formed on the second substrate.

4. The touch panel according to claim 2, wherein the touch electrode bonding area is disposed on a peripheral area of the first substrate and electrically connected with the touch electrode pattern.

5. A touch display device, comprising a display panel and the touch panel according to claim 1, wherein the touch panel is disposed on a display surface side of the display panel.

6. The touch panel according to claim 2, wherein at least one of an adhesive layer or a gap layer is disposed between the first blanking layer formed on the first substrate and the second blanking layer formed on the second substrate.

7. The touch display device according to claim 5, wherein the touch electrode layer includes a touch electrode pattern and a touch electrode bonding area.

8. The touch display device according to claim 5, wherein at least one of an adhesive layer or a gap layer is disposed between the first blanking layer formed on the first substrate and the second blanking layer formed on the second substrate.

9. The touch display device according to claim 5, wherein the touch electrode bonding area is disposed on a peripheral area of the first substrate and electrically connected with the touch electrode pattern.

10. A method for manufacturing a touch panel, comprising:
forming a first blanking layer on a first substrate;
forming a touch electrode layer on the first blanking layer;
forming a second blanking layer on a second substrate; and
bonding the first substrate and the second substrate so that a side of the first substrate provided with the first blanking layer and the touch electrode layer to face a side of the second substrate provided with the second blanking layer,
wherein the touch electrode layer is located at a side of the first blanking layer opposite to the first substrate, and the touch electrode layer is located between the first blanking layer and the second blanking layer,
wherein the touch panel further comprises a black matrix (BM) layer disposed on the peripheral area of the first substrate,
the first blanking layer is disposed on the black matrix layer,
at least one of the first blanking layer or the second blanking layer includes a superimposed layer of silicon dioxide ($SiO_2$) and niobium pentoxide ($Nb_2O_5$), a thickness of the silicon dioxide is 5-15 nm and a thickness of the niobium pentoxide is 10-40 nm,
wherein the second substrate is a cover glass.

11. The method according to claim 10, wherein forming the touch electrode layer on the first blanking layer includes: depositing a conductive film on the first blanking layer, patterning the conductive film to form the touch electrode layer, the touch electrode layer includes a touch electrode pattern and a touch electrode bonding area electrically connected with the touch electrode pattern.

12. The method according to claim 10, wherein bonding the first substrate and the second substrate includes: applying an adhesive layer between the first substrate provided with the first blanking layer and the touch electrode layer and the second substrate provided with the second blanking layer so as to bond the first substrate and the second substrate.

* * * * *